(No Model.)
D. N. MELVIN.
PROCESS OF MANUFACTURING LINOLEUM FLOOR CLOTH.
No. 412,279. Patented Oct. 8, 1889.
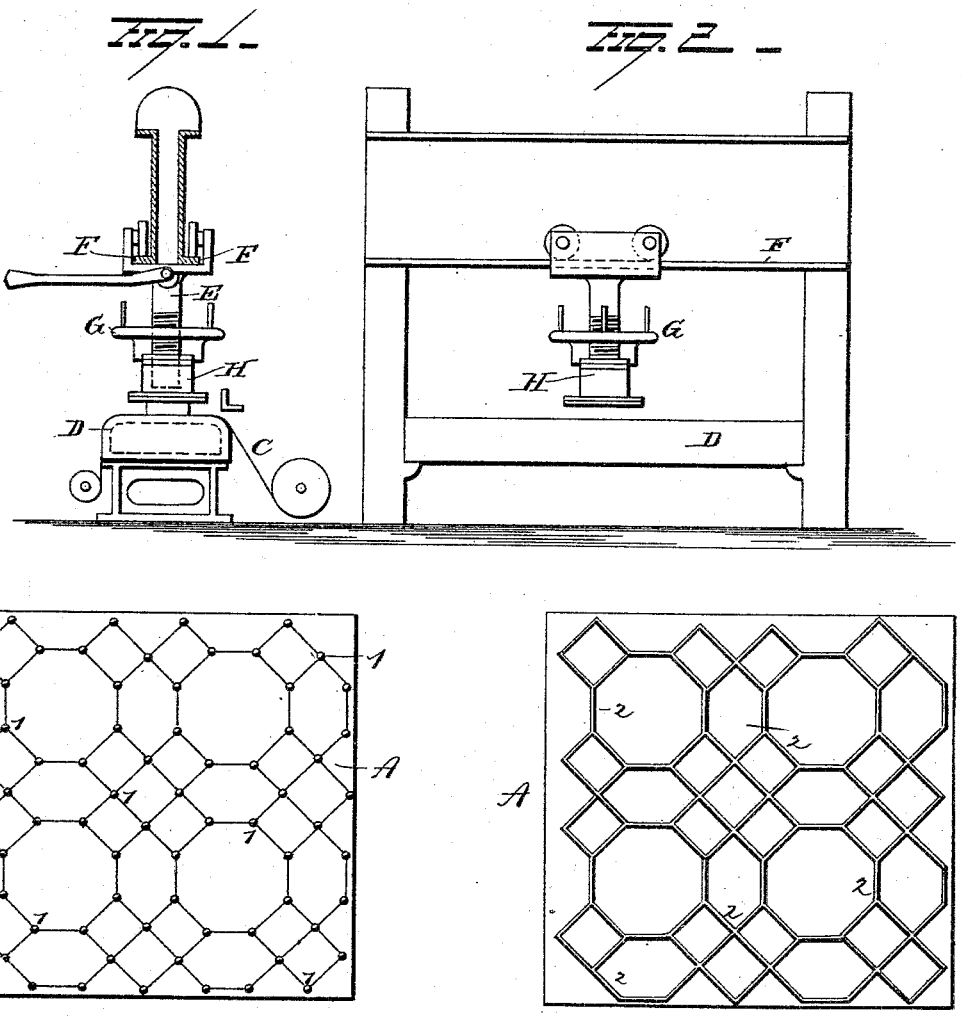

UNITED STATES PATENT OFFICE.

DAVID NEILSON MELVIN, OF LINOLEUMVILLE, NEW YORK.

PROCESS OF MANUFACTURING LINOLEUM FLOOR-CLOTH.

SPECIFICATION forming part of Letters Patent No. 412,279, dated October 8, 1889.

Application filed August 13, 1889. Serial No. 320,574. (No specimens.)

*To all whom it may concern:*

Be it known that I, DAVID NEILSON MELVIN, of Linoleumville, in the county of Richmond and State of New York, have invented certain new and useful Improvements in the Process of Manufacturing Linoleum Floor-Cloth; and I do hereby declare the following to be a full, clear, and exact description of the invention, such as will enable others skilled in the art to which it appertains to make and use the same.

My invention relates to an improvement in the process of manufacturing inlaid linoleum floor-cloth, the object being to furnish a greatly-improved product at less than the usual cost, and in so doing prevent the ragged and irregular combining which takes place at the joints of the different-colored blocks composing the cloth commonly made; but on the contrary to form clean and defined lines where the pieces are joined.

With this end in view my improved process consists, essentially, in the following steps, namely: the sheeting of granulated linoleum composition into an adherent spongy texture of sufficient tenacity to admit of cutting into blocks of the required shapes, temporarily arranging these shapes in their proper order upon a block, from which they are transferred to the canvas backing, applying sufficient pressure to the block to force the composition into the interstices of the canvas and to join the edges together, and, finally, after slightly heating the linoleum thus partially formed, applying additional pressure while heated to form a perfectly smooth and compact sheet of linoleum, and give a finish to the material by leaving the edges of the variously-colored blocks even, defined, and coherent.

It further consists in certain novel steps hereinafter described, and pointed out in the claims.

In the accompanying drawings, Figure 1 is a front elevation of one form of apparatus employed in the process to be described. Fig. 2 is a side elevation. Fig. 3 is a view of one of the pattern-blocks used, and Fig. 4 is a modified form of block.

Sheets of linoleum composition of various colors are first formed by subjecting unheated granulated composition to sufficient pressure—roller or otherwise—to form it into a spongy texture sufficiently coherent to be handled as much as required and be cut into various shapes by means of dies or rollers. The shapes are then cut from the different-colored sheets of composition and placed in proper order upon a block, from which they are transferred to the canvas constituting the back or foundation of the linoleum. These blocks are of two varieties, as shown in Figs. 3 and 4, but before entering into a description of them I desire in this connection to distinguish between the common and known method of treating these shapes and my own method, in order to render manifest the important departure which I make and to conclusively demonstrate its superiorities.

Heretofore the linoleum has been made complete and then cut into shapes and secured on the foundation by an adhesive material; but the great objection to this method is that the shapes will not adhere permanently, because they are already oxidized before they are placed on the foundation, and hence a homogeneous material is not formed. In my process the shapes are cut from linoleum composition, not the completed and oxidized linoleum, but from the composition of spongy texture and then pressed, thus adding greatly to the adhesiveness without the use of any interposed adhesive material. This is generally deemed unnecessary, but should it ever prove advantageous I wish to reserve the right to use it. One form of block upon which these shapes are placed is illustrated in Fig. 3. This block A is preferably of wood, and has lines marked thereon to indicate the shape to be attached at a particular place, and to hold these shapes to the face of the block temporarily sharp pins 1 1 project from it. These penetrate the composition shapes sufficiently to hold them in place and prevent them from dropping when the block is inverted, and at the same time create an almost imperceptible resistance when the block is removed. In addition to this, the pins serve as guides to indicate the positions for the shapes. The other block or form is shown in Fig. 4. This block is also preferably of wood, with thin metal edgings 2 2, in place of the marked boundary-lines in the other form to surround and separate the openings for the shapes. These edges project from the face of the block to a slightly less extent than the thickness of the linoleum shapes. The shapes are fitted into these spaces, where they are held in the desired arrangement or pattern until inverted. When the blocks of either form are thus filled with the different shapes required to make up a completed pattern, the block is placed face downward upon the canvas C, which is stretched over a steam-heated table D, and pressure is applied to the block by means of suitable power—such, for instance, as a hydrostatic press E, as shown, this ram traveling on rollers mounted on tracks F F. The press is screw-threaded at its lower end and a wheel G is fitted to it. This wheel carries the platen H, so that by turning it the platen may be raised after the pressure is removed. Of course this might be reversed and the shapes could be placed in contact with a canvas stretched above, so that the pressure could be applied from beneath and the inverting of the block would then be unnecessary. The result of the pressure is to force the composition shapes into the interstices of the canvas to join the contiguous edges, and to partially harden, solidify, and calender the entire surface. Upon removing the block or form the shapes are all left in position adhering firmly to the canvas, with a shallow narrow space between the shapes, in case the second form of pattern-block is used, left by the brass edgings. After a sufficient number of sections has been laid upon the canvas in this manner a hot plate is placed over them, and the press is again run down upon the entire sheet until all the spaces made by the edgings or holes left by the pins are closed, and the cloth becomes of the usual density and strength of ordinary linoleum. By this last process the edges are left perfectly straight, smooth, regular, and defined, without the colors running into each other in the slightest degree, and, furthermore, the material is rendered hard, compact, and durable, in order to withstand the punishment to which such material is continually subjected.

Having fully described my invention, what I claim as new, and desire to secure by Letters Patent, is—

1. The process of manufacturing linoleum floor-cloth, consisting in forming granulated linoleum composition into sheets of spongy texture, cutting the sheets into shapes, arranging the shapes on a flexible back or foundation, and pressing these shapes into the foundation, substantially as set forth.

2. The process of manufacturing linoleum floor-cloth, consisting of forming sheets of spongy texture from unheated granulated linoleum composition, cutting the sheets into shapes, arranging the shapes in a block or form, placing the block with the face toward a canvas foundation drawn across a heated table, pressing said block or form until the shapes adhere to the canvas and their edges are partly joined, removing the block or form, and finally subjecting the whole to hydraulic or other pressure until all the interstices are closed, the shapes adhere to one another, and the whole sheet is made compact and smooth, substantially as set forth.

3. The process for the manufacture of linoleum floor-cloth, consisting in forming sheets of spongy texture from linoleum composition, cutting these sheets into shapes, arranging the shapes on a block or form, placing the shapes against a canvas, pressing the block until the shapes adhere to the canvas, removing the block, and finally heating and again pressing the materials, substantially as set forth.

In testimony whereof I have signed this specification in the presence of two subscribing witnesses.

DAVID NEILSON MELVIN.

Witnesses:
GEORGE HOPE,
HENRY S. KNIEP.